US012104607B2

(12) United States Patent
Gajewski et al.

(10) Patent No.: US 12,104,607 B2
(45) **Date of Patent: *Oct. 1, 2024**

(54) FAN WITH A TRANSLUCENT BLADE SUPPORT

(71) Applicant: Wangs Alliance Corporation, Port Washington, NY (US)

(72) Inventors: Mark Gajewski, Lakeland, FL (US); Alexander Ostrovsky, Carmel, IN (US)

(73) Assignee: Wangs Alliance Corporation, Port Washington, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/443,545

(22) Filed: Feb. 16, 2024

(65) Prior Publication Data

US 2024/0271630 A1 Aug. 15, 2024

Related U.S. Application Data

(63) Continuation of application No. 18/432,478, filed on Feb. 5, 2024, which is a continuation of application No. 18/215,994, filed on Jun. 29, 2023, now Pat. No. 11,892,002.

(60) Provisional application No. 63/445,076, filed on Feb. 13, 2023.

(51) Int. Cl.

| | |
|---|---|
| ***F04D 25/08*** | (2006.01) |
| ***F04D 29/00*** | (2006.01) |
| ***F04D 29/02*** | (2006.01) |
| ***F04D 29/34*** | (2006.01) |
| ***F04D 29/38*** | (2006.01) |
| ***F21V 33/00*** | (2006.01) |
| *F21Y 115/10* | (2016.01) |

(52) U.S. Cl.

CPC ......... *F04D 25/088* (2013.01); *F04D 29/005* (2013.01); *F04D 29/023* (2013.01); *F04D 29/34* (2013.01); *F04D 29/38* (2013.01); *F21V 33/0096* (2013.01); *F21Y 2115/10* (2016.08)

(58) Field of Classification Search

None

See application file for complete search history.

(56) References Cited

PUBLICATIONS

Mini Eterfan Spec & User Manual (Year: 2015).*

(Continued)

*Primary Examiner* — Juan G Flores

(74) *Attorney, Agent, or Firm* — Weiss & Arons LLP

(57) ABSTRACT

Apparatus and methods for circulating air. The apparatus may include a ceiling fan and may include a light fixture. A motor assembly may drive the fan about a rotational axis. Blades of the fan may be fixed to an outer ring of a blade bracket. Blades may extend away from the outer ring. The blade bracket may also include a translucent blade support to which the outer ring may be fixed. The translucent blade support may be disc shaped. A blade holder adapter may fix an inner portion of the translucent blade support to the ceiling fan. The fan may be configured such that a portion of the translucent blade support may provide a view unobscured by the translucent blade support so that there may be at least partial visibility of a visible element, such as a structure, above the translucent blade support from below the apparatus.

27 Claims, 9 Drawing Sheets

(56) References Cited

PUBLICATIONS

Craftmade Bordeaux BRD52PLN3 (accessed Aug. 30, 2023, review comments evidence product availability as early as 2020—https://www.amazon.com/Craftmade-Ceiling-BRD52PLN3-Bordeaux-Polished/product-reviews/B077PPWYJ1/ref=cm_cr_dp_d_show_all_btm?ie=UTF8&reviewerType=all_reviews) (Year: 2020).*

"Stone Wall LED Light," Tom Dixon, https://www.architonic.com/en/product/tom-dixon-stone-pendant-led/1467432, 2020.

"Elehinser 60 Inch Ceiling Fan Without Lights, Wood 8 Blades 6-Speed Noiseless Reversible DC Motor, Modern Large Remote Control Ceiling Fan for Bedroom Dining Living Room, Gold Finish+Black," https://www.amazon.com/Elehinser-Ceiling-without-Light-Black/dp/BOBR4RTZDT/ref=sxin_13_pa_sp_search_thematic_sspa?content-id=amznl.sym.d17ca69f-la39-4f7d-a62f-e5dff4cfd6d8%3Aamzn1.sym.d17ca69f-la39-4f7d-a62f-c5dff4cfd6d8&crid=2YU4P3PDB149S&cv_ct_c=undefined&th=1, Retrieved on Jan. 24, 2024.

Mini Enterfan Spec and User Manual (Year: 2015).

* cited by examiner

FAN WITH A TRANSLUCENT BLADE SUPPORT

CROSS-REFERENCE TO RELATED APPLICATION

This is a continuation of U.S. patent application Ser. No. 18/432,478, filed Feb. 5, 2024, which is a continuation of U.S. patent application Ser. No. 18/215,994, filed Jun. 29, 2023 and issued as U.S. Pat. No. 11,892,002 on Feb. 6, 2024, which is a nonprovisional application of U.S. Provisional Application No. 63/445,076, filed Feb. 13, 2023, each of which is hereby incorporated by reference herein in its entirety.

BACKGROUND

A ceiling fan may block from view a significant portion of a structure to which it is mounted. This may be due, for example, to the housing size, the number of blades, and a light fixture that may be included in the ceiling fan, or other factors. As the ceiling fan rotates, the blades may obscure ceiling space. A user may wish to have a ceiling fan that keeps more of the structure above the ceiling fan unobscured from view when the fan is in use or when not in use. This may be particularly true where the ceiling has an aesthetically pleasing color or pattern.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
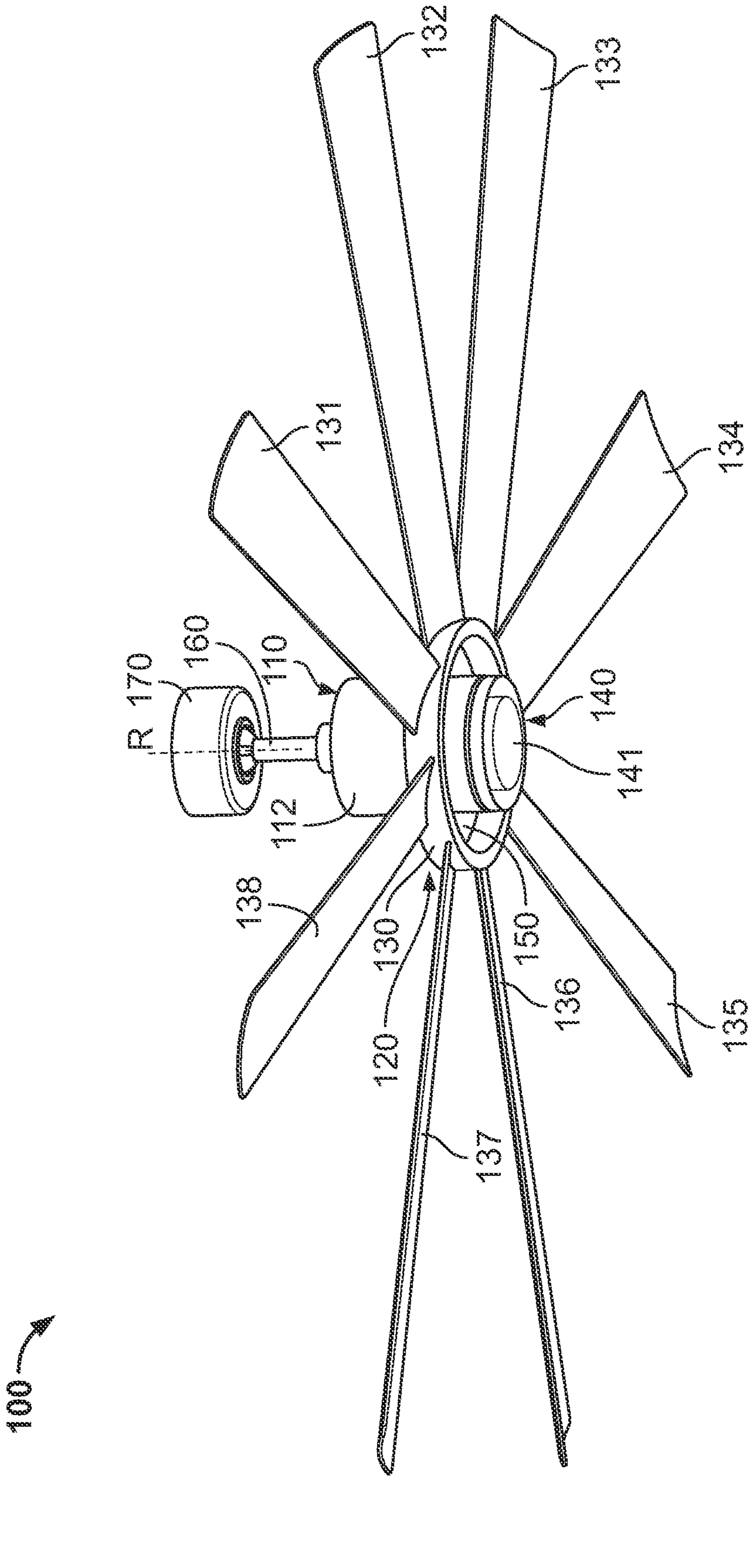
FIG. 1 shows a perspective view of an illustrative apparatus in accordance with principles of the invention.

An apparatus and methods for circulating air may be provided.

The apparatus may include a fixture housing. The apparatus may include a fan. The apparatus may include a fan blade. The fan blade may be configured to extend away from the blade bracket. The fan blade may be one of a plurality of fan blades.

The apparatus may include a blade bracket. The plurality of fan blades may extend from the blade bracket. The plurality of fan blades may be configured to be fixed, at the blade bracket, to the fixture housing.

The blade bracket may be configured to be rotated by a fan motor. In operation, when the fan is rotating, the rotation of the blade bracket may define a rotational axis. The fixture housing may define a first distance extending perpendicularly away from the rotational axis. The blade bracket may define a second distance extending perpendicularly away from the rotational axis. The blade bracket may include a translucent material. The translucent material may extend away from the axis between the first distance and the second distance. The second distance may be greater than the first distance.

The translucent material may include a first portion that is configured to be fixed to the fixture housing. The translucent material may include a second portion that is configured to be fixed to the fan blade. In operation, the first and the second portions may be obscured from view from below the apparatus. The translucent material may be configured to be fixed to the fixture housing with a blade holder adapter.

The blade bracket may extend continuously about the axis. The blade bracket may include a ring. The translucent material may extend circumferentially around the axis. The translucent material may extend some or all of the 360° about the axis. The translucent material may be transparent. The translucent material may include acrylic. The translucent material may include crystal. The translucent material may include glass. The translucent material may include a polymer. The translucent material may include a first portion that is configured to be fixed to the fixture housing. The translucent material may include a second portion that is configured to be fixed to the ring. The fan blade may be fixed to the ring. The blade bracket, including the translucent material, may rotate with the fan blade when the apparatus is in operation.

The apparatus may include a downrod that is configured to depend from a structure. The downrod may support the fan motor. The downrod may define, in operation, a vertical direction. The translucent material may be vertically, in an operational orientation, above the fixture housing. The vertical direction may be defined by the rotational axis.

The apparatus may include a downrod that is configured to depend from a structure. The downrod may support the fan motor. The downrod may define, in operation, a vertical direction. The translucent material may be vertically, in an operational orientation, below the fixture housing. The vertical direction may be defined by the rotational axis.

The apparatus may further include a light module. The light module may include a light emitting diode ("LED") light.

The apparatus may include a light fixture that is vertically below the translucent material. The light fixture may include a light module.

An outer perimeter of the fixture housing may define a first distance, and an inner perimeter of the ring may define a second distance. The portion of the translucent material between the first distance and the second distance may be unobscured.

The fixture housing may be circular.

The fixture housing may be configured to be mounted to a surface. The fixture housing may have an exterior that does not exceed the first distance. In operation, an unobscured portion of the translucent material may be configured to provide at least partial visibility of a visible element above the unobscured portion to a viewer below the translucent material. The visible element may be a ceiling.

The fixture housing may include a first chamber and a second chamber. The translucent material may be, in operation, vertically between the first and second chambers. The first chamber may include the fan motor. The second chamber may include a rotor. The second chamber may include an LED light module.

The invention is further illustrated with reference to FIGS. 1-9.

FIG. 1 shows an illustrative apparatus, such as a ceiling fan 100 for circulating air. Fan 100 may include a motor assembly 110. Motor assembly 110 may include a housing 112. Housing 112 may have a first, outer radius that extends perpendicularly to the rotational axis of fan 100. This first radius may correspond to a first distance extending perpendicularly from a rotational axis. Housing 112 or a portion thereof may be considered a first chamber of a fixture housing.

Fan 100 may include a blade bracket 120. Blade bracket 120 may be configured to fix fan blades to fan 100. Blade bracket 120 may include a mounting ring 130 to which fan blades may be fixed. Mounting ring 130 may have a second radius that extends perpendicularly to the rotational axis of fan 100. This second radius may be on an inside surface of mounting ring 130. The second radius may be larger than the first radius.

Fan 100 may include one or more blades. Eight blades 131, 132, 133, 134, 135, 136, 137 and 138 are shown in the illustrated example. Each of blades 131-138 may be mounted to blade bracket 120 along a perimeter of blade bracket 120. The blades may be configured to extend away from blade bracket 120. The blades may be configured to extend outwardly from blade bracket 120. Blades 131-138 may be variously dimensioned. Each blade may be spaced an equal distance from adjacent blades.

Fan 100 may also include a light fixture 140 fixed to ceiling fan 100. Light fixture 140 or a portion thereof may be considered a second chamber of a fixture housing. Light fixture 140 may be fixed to housing 112 and may extend below housing 112. Light fixture 140 may include a light shade 141 that covers light fixture 140. Light shade 141 may be made from a material, such as acrylic, glass, or another translucent material.

Blade bracket 120 may include a translucent material. The translucent material may include a translucent blade support 150 that may be fixed to mounting ring 130. Translucent blade support 150 may be disc-shaped and may include a circular opening at its center. Blade bracket 120, including mounting ring 130 and translucent blade support 150, may rotate, in operation. The rotation of the blade bracket 120 may define a rotational axis R of fan 100. Translucent blade support 150 may extend circumferentially about the rotational axis R, such as 360 degrees about the axis. Blades 131-138 may extend perpendicularly to rotational axis R.

Translucent blade support 150 may include a translucent material. The translucent material may be transparent or may be non-transparent. The translucent material may include acrylic. The translucent material may include crystal. The translucent material may include glass. The translucent material may include a polymer.

Fan 100 may be mounted to a structure (not shown), such as a ceiling, and may depend from the structure. For example, fan 100 may be suspended from the structure, with a downrod 160. A canopy 170 may cover mechanical and electrical connections. Canopy 170 may include a canopy ring. Downrod 160 may define, in operation, a vertical direction. The vertical direction may be parallel or coincident with the rotational axis R.

Figure 2:
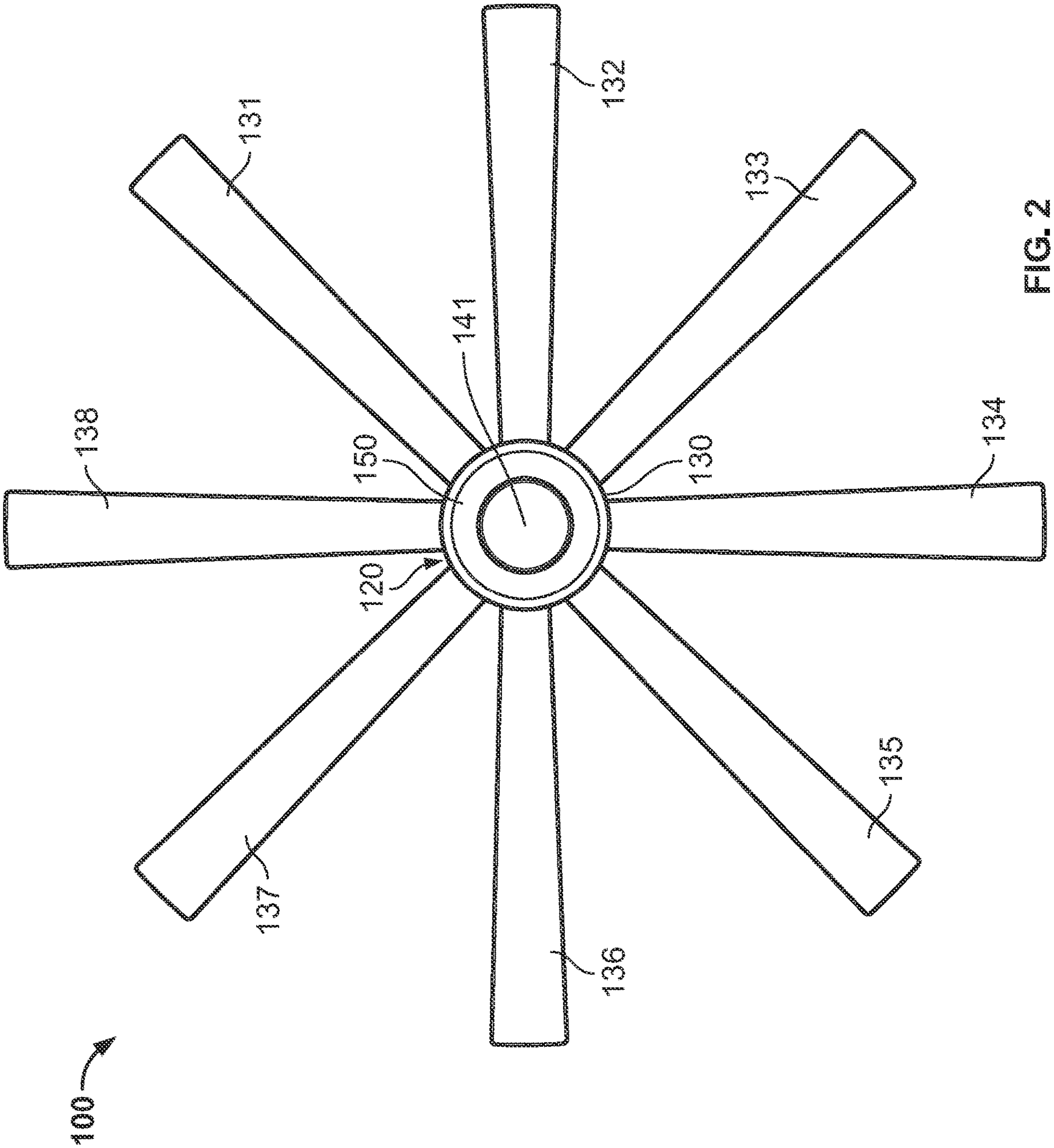
FIG. 2 is a view of the illustrative apparatus of FIG. 1 from below in accordance with principles of the invention.

FIG. 2 is a view of the illustrative fan 100 of FIG. 1 from below. Translucent blade support 150 may be colored or patterned to blend with background structure, such as the ceiling, to hide mechanical connections between blade bracket 120 and central elements of the fan such as light shade 141. Visible elements of fan 100 in FIG. 2 may include light shade 141 and blade bracket 120. Blade bracket 120 may include ring 130 and translucent blade support 150.

Figure 3:
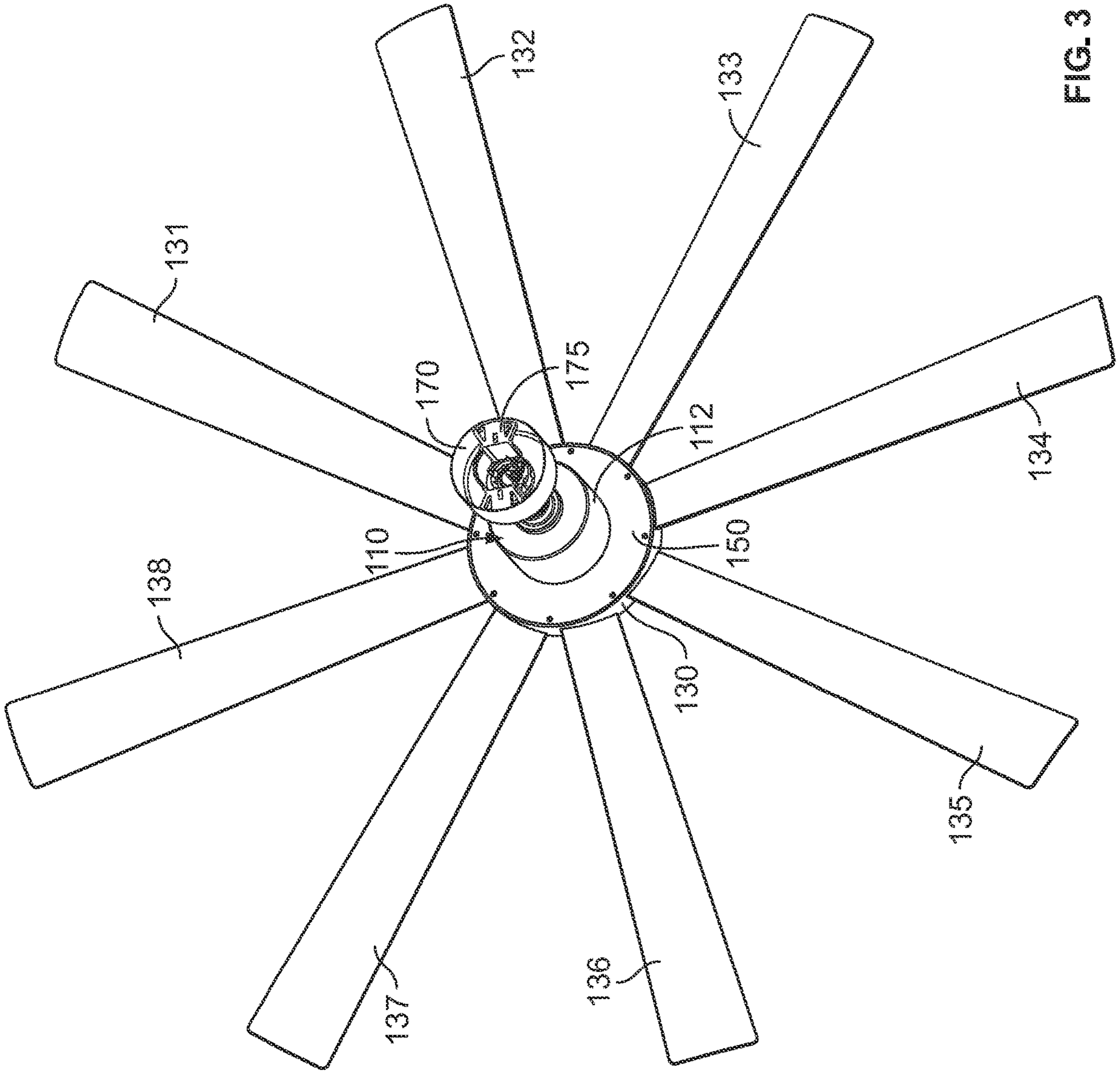
FIG. 3 shows a perspective view of the illustrative apparatus from above in accordance with principles of the invention.

FIG. 3 shows a perspective view of the fan of FIG. 1 from above. Outer ring 130 and a top of translucent ring-shaped material 150 are visible. An inner portion of translucent blade support 150 may be covered by a motor assembly 110, that includes an exterior housing 112. The inside of canopy 170 may include a hanger assembly mounting bracket 175 for mounting fan 100 to a ceiling.

Figure 4:
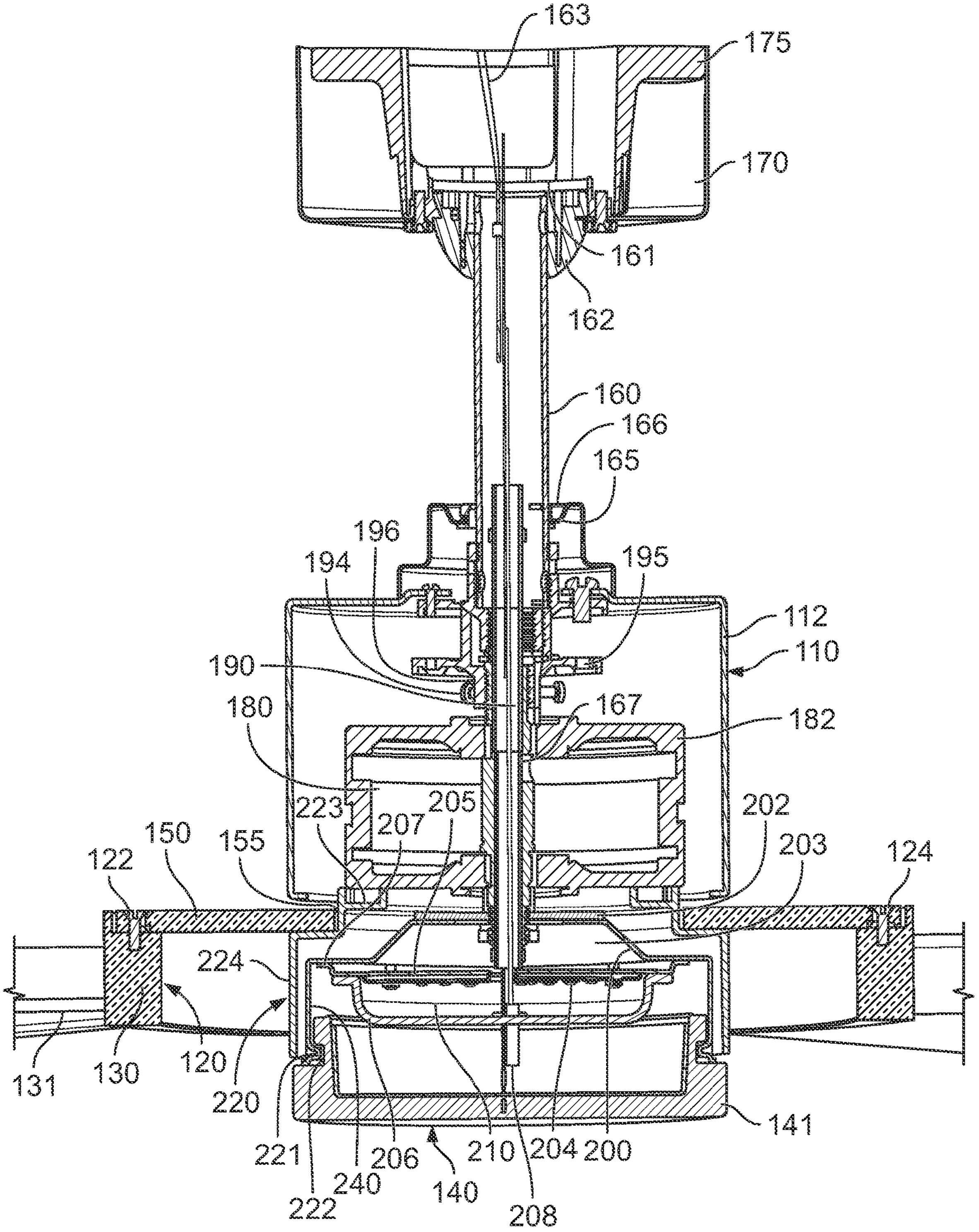
FIG. 4 shows illustrative stationary and rotating elements of the apparatus in partial cross-section in accordance with principles of the invention.

FIG. 4 shows a partial vertical cross-section showing components of fan 100.

Translucent blade support 150 may include a circular opening 155 at its center. An inner portion of translucent blade support 150 may be fixed to a blade holder adapter 220. Blade holder adapter 220 may include a first section 223 that extends upward to fix blade bracket 130 to motor 180. Blade holder adapter 220 may include a second section 224 that extends downward and forms a cylinder-shape that surrounds, but is spaced away from, an exterior of light fixture 140.

Motor assembly 110 may include a motor 180 surrounded by an enclosure 182. Motor 180 may be a brushless motor. Motor 180 may be configured to rotate about a motor axle 167, thereby causing the rotation of blade bracket 120 and blades 131-138. Motor axle 167 may extend about a shaft 190. Alternatively, motor 180 may include a rotor (not shown) that is configured to rotate and cause the rotation of motor axle 167, without motor 180 rotating. A flywheel 195 may be fixed to motor axle 167 to smooth the rotational motions of fan 100, such as may be caused by power fluctuations. Flywheel 195 may have a shaft 196 that may be fixed to motor axle 167 with a screw 194.

Translucent blade support 150 may be located below motor assembly 110, as shown. Translucent blade support 150 may be fixed to ring 120 with fasteners, such as screws 122, 124. Alternatively, translucent blade support 150 may be located above motor assembly 110 (not shown).

A first, outer portion of translucent blade support 150 may be obscured from view below fan 100 by a portion of mounting ring 130 that may be connected to a bottom of translucent blade support 150. A second, inner portion of the translucent blade support 150 may be obscured by a connection of translucent material to blade holder adapter 220. This may leave an intermediate portion of translucent blade support 150 between the first and second portions that may provide an unobscured view from below fan 100 to visible elements above fan 100, such as a ceiling, above fan 100. The unobscured intermediate portion may vary in size.

To further enable an unobstructed view to the visible elements above fan 100 along a portion of translucent blade support 150, a diameter of housing 112 of motor assembly 110 and an inner section of blade holder adapter 220 may be limited so as to maximize an intermediate portion of translucent blade support 150 that is unobstructed.

Electrical wiring 163 may be connected to wiring in the ceiling and may pass through downrod 160 and motor assembly 110 to power motor 180 for fan 100 and light fixture 140. A shaft (not shown) may be located inside shaft 190 and may surround wiring 163 that passes through motor assembly 110 and through an upper portion of light fixture 140.

Light fixture 140 may be mounted to a bottom of housing 112. Light fixture 140 may include an outer adapter plate 200 that may engage with housing. Adapter plate 200 may be connected to housing 112 with an insulating layer 202 disposed between adapter plate 200 and housing 112. Insulating layer 202 may partially insulate motor assembly 110 from light fixture 140. Light fixture 140 may include a light source 204 located below a top of adapter plate 200. Light source 204 may include a module that may include an array of LED lights and may include circuitry for delivering current to one or more of the LEDs.

Adapter plate 200 may extend over light source 204 and may extend outward and then downward along a section 240 of adapter plate 200 to surround the sides of light source 204. An optional light shade 141 may fit within a bottom of adapter plate 200 to protect light source 204. Light shade 141 may include a translucent shade that may allow light to diffuse over an area below fan 100.

A space may be disposed between adapter plate 200 and light source 204 to provide an open area 203 above light source 204. The bottom of open area 203 may include a plate 205 to which light source 204 may be mounted. Plate 205 may include a raised perimeter 207 that extends upward and that may to fixed to adapter plate 200. A second open area 210 may be disposed between light source 204 and a cover 206 that may be disposed beneath light source 204. Open area 203 may be configured to house circuitry associated with light source 204. Open area 203 and open area 210 may be provided to dissipate heat that may be generated by light source 204. Cover 206 may diffuse light. Cover 206 may be transparent.

Adapter plate 200 may extend over light source 204 and may extend outward and then downward along a section 240 of adapter plate 200 to surround the sides of light source 204. An optional light shade 141 may fit within a bottom of adapter plate 200 to protect light source 204. Light shade 141 may include a translucent shade that may allow light to diffuse over an area below fan 100.

Light shade 141 may be attached to light fixture 140. The sides of adapter plate 200 may be formed of a flexible material, such as a flexible metal, that includes one or more projections 221. The one or more projections 221 may include a single circular projection. Light shade 141 may have one or more inner grooves 222 that correspond to the one or more projections 221. The one or more projections 221 may be flexible so that the one or more projections 221 may be snapped one or more inner grooves 222 to attach light shade 141 to adapter plate 200. Light shade 141 may be removable. Light shade 141 may be alternatively attached to adapter plate 200 in some other way, such as with a knob (not shown) that may be tightened to a corresponding center shaft (not shown) of light fixture 140.

As shown, fan 100 may include stationary elements and rotating elements that may rotate about a rotating axis R.

Stationary elements may include the exterior housing 112 of motor assembly 110, a downrod 160, canopy 170, mounting bracket 175 within canopy 170, an upper mounting bracket 162 for engaging an upper end of downrod 160 to canopy 170 and ceiling mounting bracket 175, and a lower mounting bracket 165 for engaging motor assembly 110 to the bottom of downrod 160. Mounting brackets 162, 165 may include holes for fasteners to fasten the brackets to downrod 160. Mounting bracket 162 may engage with downrod 160 via an upper joint 161 that may be mounted to downrod 160. Mounting bracket 165 may engage with downrod 160. Mounting bracket 165 may be covered with a cover 166. Mounting bracket 165 may engage downrod 160 via a lower joint (not shown). Mounting bracket 175 may include holes for fastening bracket 175 to ceiling. Fasteners may include, for example, screws.

Moving parts of fan 100 may include blades 131-138, blade bracket 120 (including ring 130 and translucent blade support 150), blade holder adapter 220, and motor 180.

Figure 5:
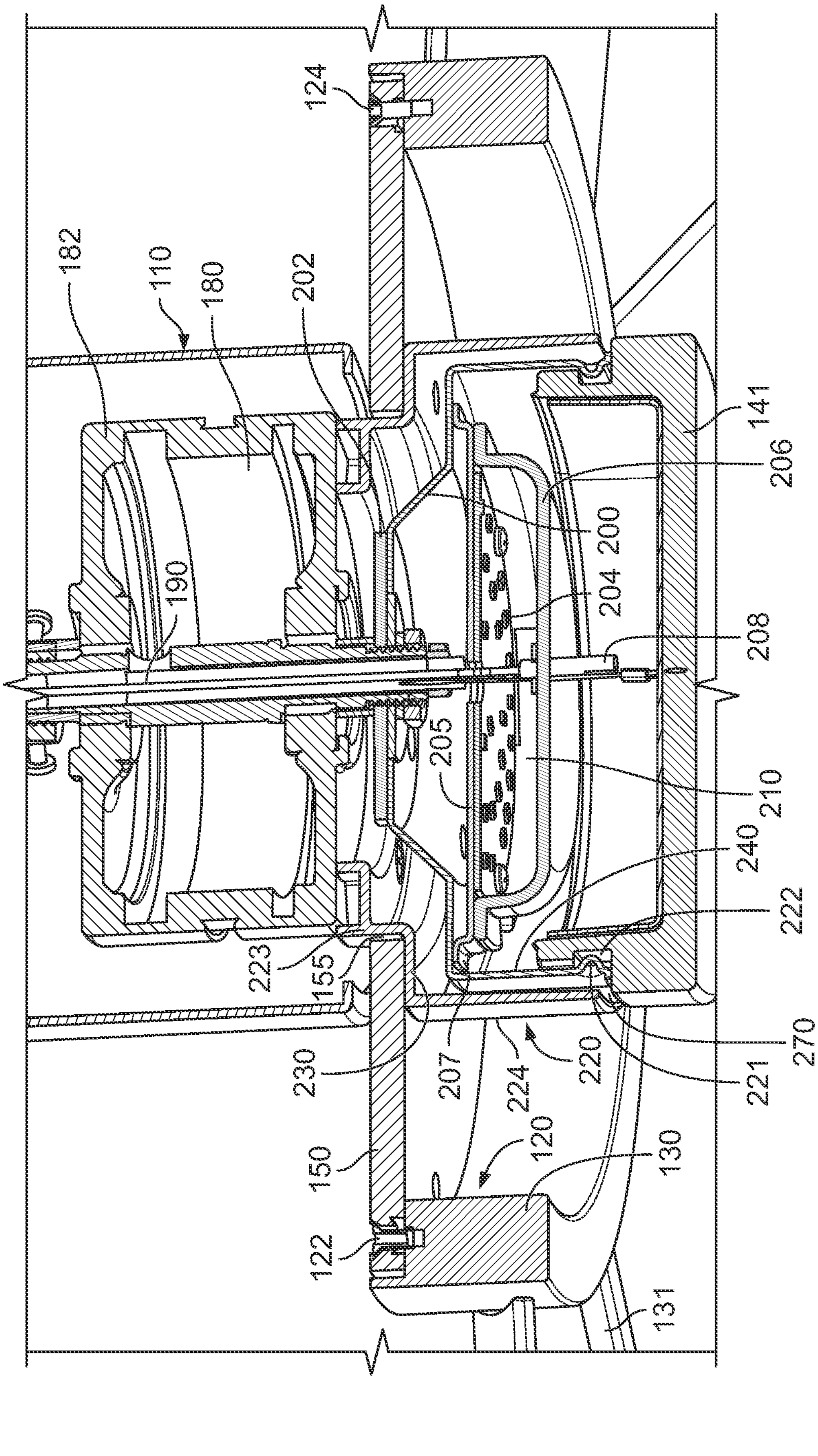
FIG. 5 shows an enlarged view of certain features shown in FIG. 4 in accordance with principles of the invention.

FIG. 5 shows an enlarged view of certain features shown in FIG. 4. As noted above, blade holder adapter 220 may include a first section 223 that extends upward to support and fix blade bracket 130 to motor 180. Section 223 of blade holder adapter 220 may include an upward-facing support having a U-shaped cross section. Blade holder adapter 220 may further include a second, lower section 224 that extends downward to form a cylinder-shape that may surround an exterior of light fixture 140. Section 224 may be spaced away from light fixture 140 by a space 270 that permits the rotation of fan 100 without interfering with light fixture 140, which does not rotate. A third section 230 of blade holder adapter 220 may be located intermediate first section 223 and second section 224. Third section 230 may be configured to be positioned approximately horizontally. Third section 230 may serve as a ledge on top of which translucent blade support 150 may be mounted.

Fan 100 may be operated by a switch, such as a remote control, a wall switch, or a switch on fixture 100. The switch may also control light fixture 140.

Figure 6:
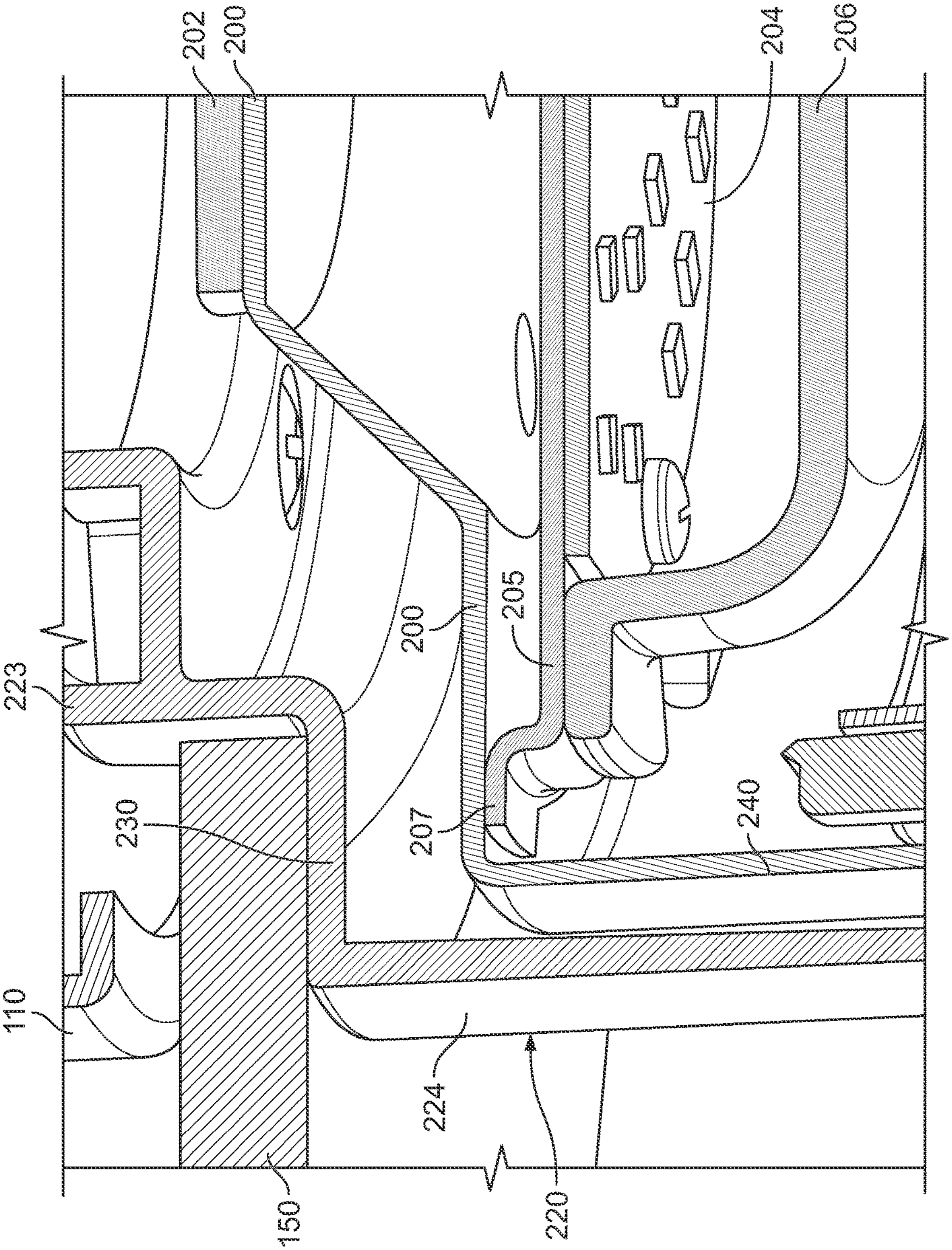
FIG. 6 is an enlarged view of features shown in FIG. 5 in accordance with principles of the invention.
Figure 7:
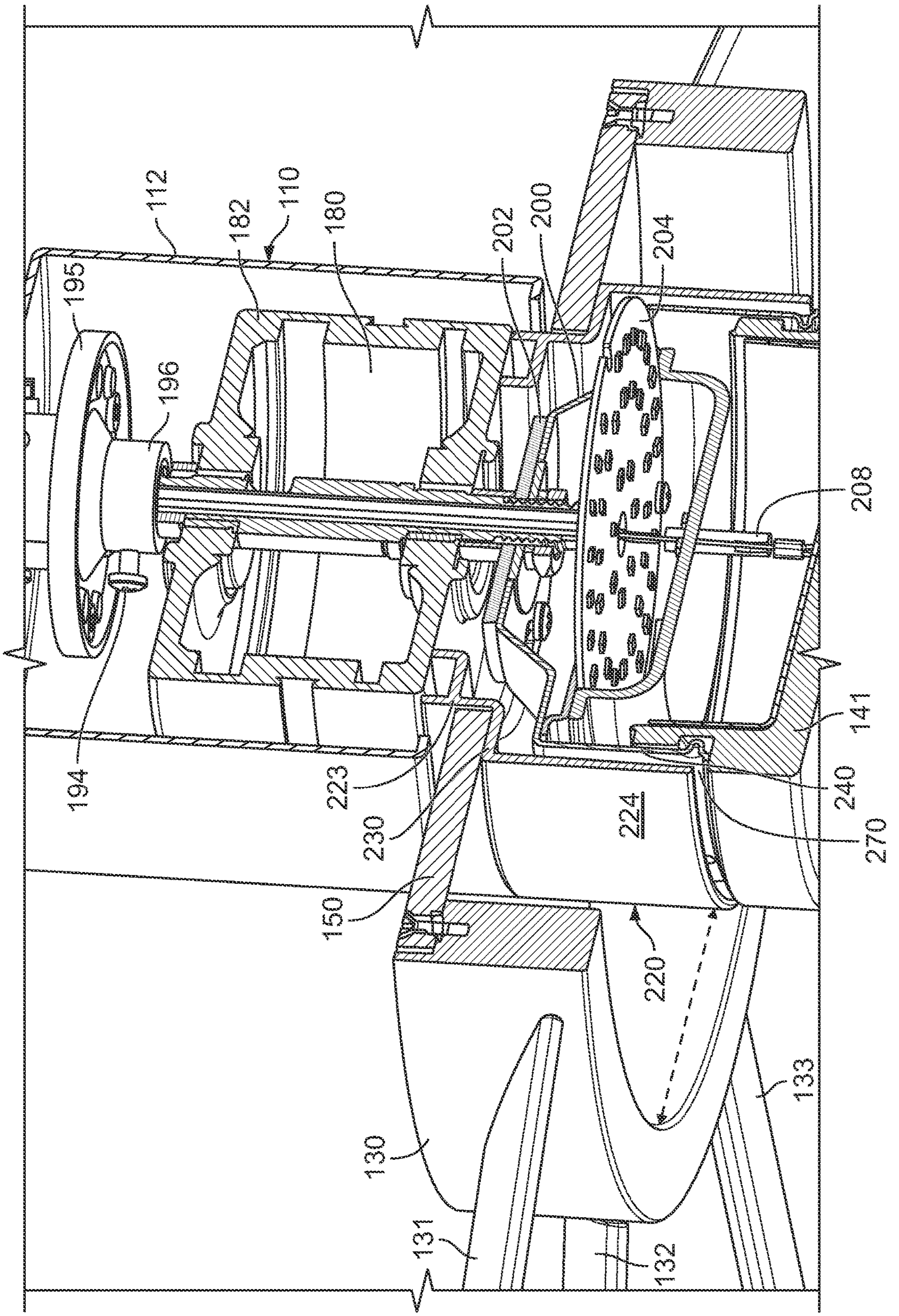
FIG. 7 is a different view of features of an illustrative apparatus in accordance with principles of the invention.
Figure 8:
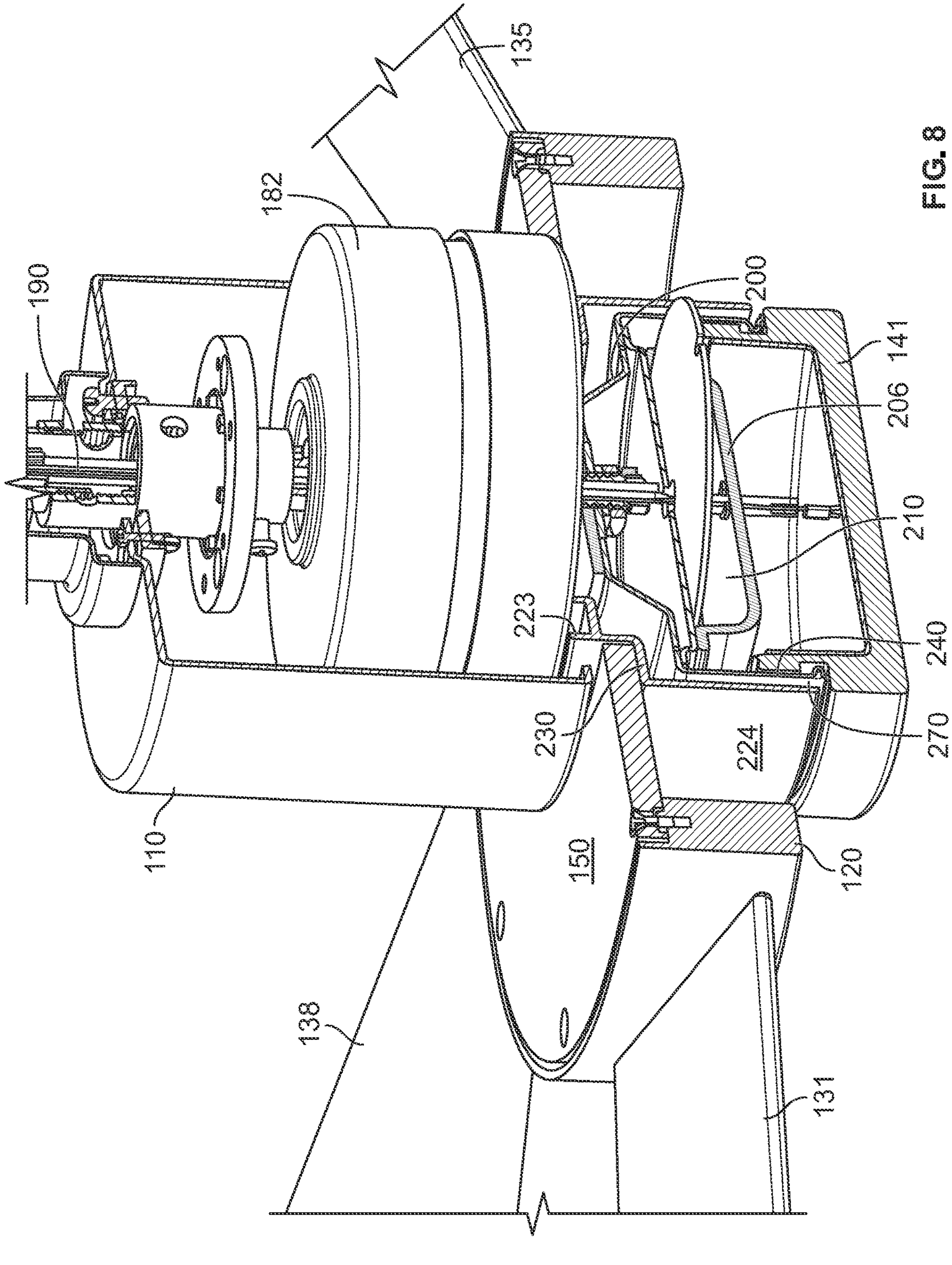
FIG. 8 is a different view of features of an illustrative apparatus in accordance with principles of the invention.

The positioning of translucent blade support 150, blade holder adapter 220 and light fixture 140 is shown further in FIGS. 6, 7 and 8. FIGS. 7 and 8 respectively show an illustrative perspective view from a lower elevation and an illustrative perspective view from a higher elevation.

In operation, when fan 100 is operated, a person viewing fan 100 from below may see visible elements above the fan 100 through the translucent blade support 150.

Figure 9:
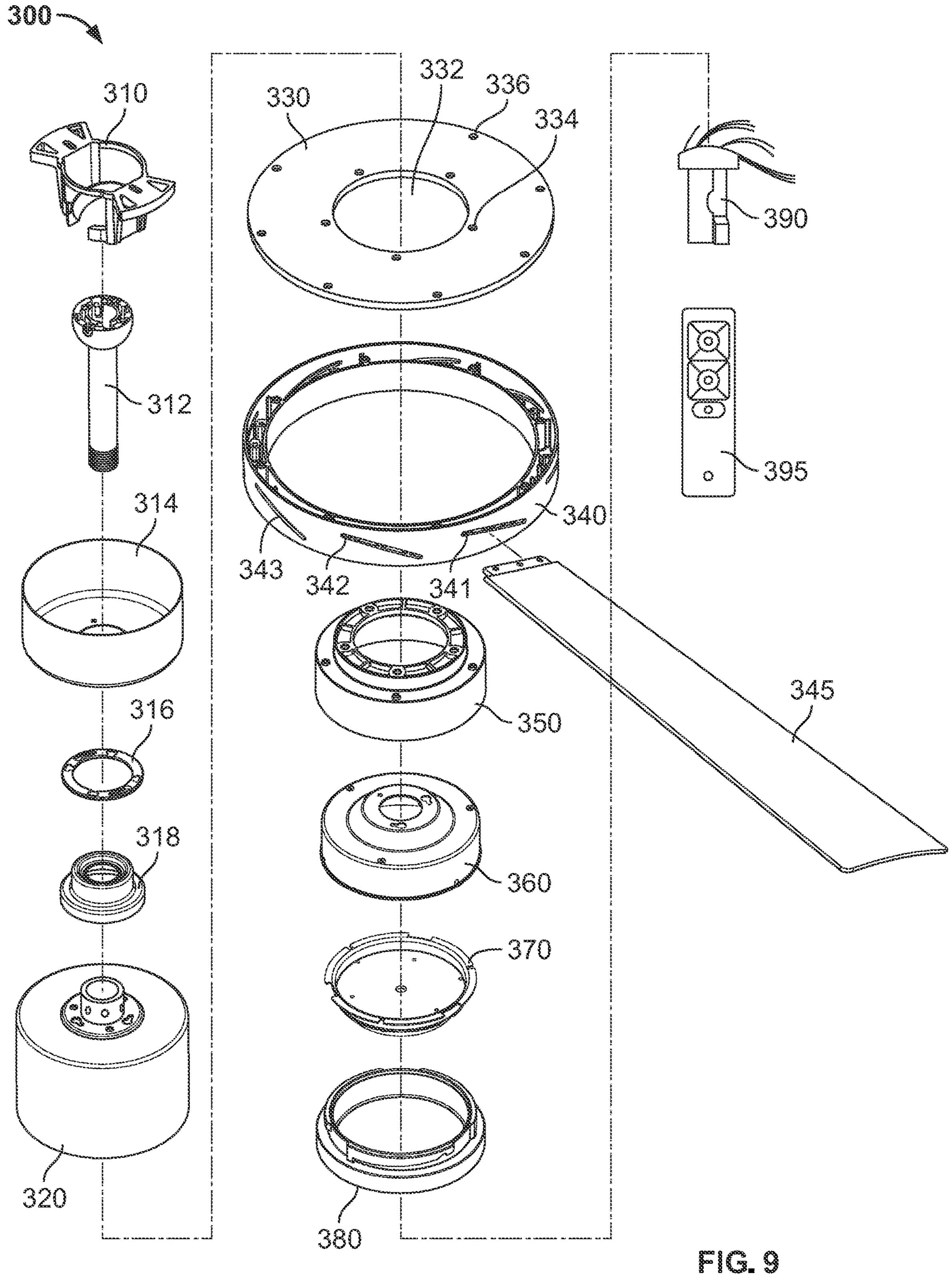
FIG. 9 shows an exploded view of an illustrative apparatus in accordance with principles of the invention.

FIG. 9 shows an exploded view of an illustrative arrangement of a fixture 300 in accordance with the invention. Fixture 300 may include an arrangement that may have one or more features in common with the arrangement of fixture 100 that is described with respect to FIGS. 1-8.

Fixture 300 may include one or more of the following components:

- a hanger assembly mounting bracket 310 to mount fixture 300 to a structure;
- a downrod 312;
- a canopy 314 including a canopy ring;
- a coupling cover 316;
- a mounting ring 318 for mounting the fixture 300;
- a motor assembly 320 for driving the rotation of the ceiling fan,
- a translucent material, such as a translucent disc 330. Translucent disc 330 may be a clear central ring. Translucent disc 330 may have a center hole 332 through which a portion of motor assembly 320 may pass. Translucent disc 330 may have inner holes 334 to fix a blade holder adapter 350 thereto. Translucent disc 330 may have outer holes 336 to fix a mounting ring 340 thereto;
- one or more blades 345;
- a mounting ring 340 to which the one or more blades 345 may be fixed. The blades 345 may be mounted to extend outward, away from the rotational axis of the apparatus. Mounting ring 340 may be fixed to an outer portion of translucent disc 330. A blade bracket may include mounting ring 340 and translucent disc 330;
- a blade holder adapter 350 to fix the blade bracket to motor assembly 320;
- an adapter plate 360 for the light fixture.

a light emitting diode ("LED") module 370, including circuitry for delivering current to one or more LEDs may be included under adapter plate 360. Light module may be fixed to adapter plate 360;

an acrylic shade 380 under LED module 370;

wiring 390;

an optional remote control 395, separate from the fan, for remotely controlling the fixture.

One of ordinary skill in the art will appreciate that the steps shown and described herein may be performed in other than the recited order and that one or more steps illustrated may be optional.

Apparatus and methods may involve the use of any suitable combination of elements, components, or method steps disclosed herein. Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional, and procedural modifications or omissions may be made without departing from the scope and spirit of the present invention.

Thus, apparatus and methods for providing an apparatus for circulating air have been provided. Persons skilled in the art will appreciate that the present invention may be practiced by other than the described embodiments, which are presented for purposes of illustration rather than of limitation.

What is claimed is:

1. An apparatus comprising:

a housing that:

houses a fan motor; and defines a first radius;

fan blades that, from a second radius, extend away from the housing;

a translucent material that is disposed in a region:

outside the first radius; and inside the second radius; and a ring to which the fan blades are fixed;

wherein, in the region, the translucent material is the only blade-supporting structure.

2. The apparatus of claim 1 wherein:

the translucent material comprises an annulus having an inner radius and an outer radius;

the inner radius depends from the fan motor; and the fan blades depend from the annulus.

3. The apparatus of claim 1 the translucent material comprises an annulus having an inner radius and an outer radius;

the inner radius depends from a downrod; and the fan blades depend from the annulus.

4. The apparatus of claim 1 wherein the translucent material extends, between the ring and the housing, circumferentially around the housing.

5. The apparatus of claim 1 further comprising:

wherein the translucent material comprises:

a first portion that is configured to be supported adjacent the housing; and a second portion that is configured to support the fan blades.

6. The apparatus of claim 5 wherein the first and the second portions are obscured from an upward view taken from below the apparatus.

7. The apparatus of claim 1 wherein the translucent material and the ring form a blade bracket that extends continuously about an axis about which the fan blades are configured to rotate.

8. The apparatus of claim 7 wherein the blade bracket rotates with the fan blades when the fan blades are in operation.

9. The apparatus of claim 7 further comprising a blade bracket adapter that is configured to support the blade bracket.

10. The apparatus of claim 9 wherein:

the blade bracket adapter is configured to support a radially inner portion of the translucent material; and the radially inner portion has a diameter that is smaller in size than an innermost diameter of an unobscured portion of the translucent material.

11. The apparatus of claim 1 wherein the translucent material is transparent.

12. The apparatus of claim 1 further comprising a downrod that is configured to:

depend from a structure and support the housing; and define, in operation, a vertical direction;

wherein the translucent material is vertically, in an operational orientation, below the housing.

13. The apparatus of claim 12 wherein the vertical direction is defined by a rotational axis of the fan blades.

14. The apparatus of claim 1 wherein the apparatus further comprises a light source.

15. The apparatus of claim 14 wherein the light source comprises a light emitting diode.

16. The apparatus of claim 1 wherein the translucent material includes crystal.

17. The apparatus of claim 1, wherein the translucent material, in operation, is at a first elevation; and the fan blades are at a second elevation that is different from the first elevation.

18. An apparatus comprising:

a housing that houses a fan motor;

fan blades extending radially away from the housing;

a translucent material disposed between the housing and the fan blades; and a ring to which the fan blades are fixed;

wherein:

the translucent material is the only structure of the apparatus that extends radially between the housing and the ring; and the fan blades are configured to be fixed by fasteners to the ring.

19. An apparatus comprising:

a housing that:

houses a fan motor; and defines a first radius;

fan blades that, from a second radius, extend away from the housing; and a light transmissive material that is disposed in a region:

outside the first radius; and inside the second radius; and a ring to which the fan blades are fixed;

wherein, in the region, the light transmissive material:

is the only blade-supporting structure; and provides at least partial visibility of a surface above the light transmissive material as viewed from below the light transmissive material.

20. The apparatus of claim 19 wherein:

the fan blades are suspended below the surface; and the surface is a ceiling.

21. The apparatus of claim 19 wherein the surface above the light transmissive material that is at least partially visible from below the light transmissive material is a mounting surface to which the apparatus is to be attached.

22. The apparatus of claim 19 wherein the ring and the fan blades are supported by the light transmissive material.

23. The apparatus of claim 19 wherein the light transmissive material is fixed to a top of the ring.

24. The apparatus of claim 19 wherein the light transmissive material rotates with the fan blades when the fan blades are in operation.

25. The apparatus of claim 19 further comprising a blade bracket adapter that is configured to support a blade bracket that:

comprises the light transmissive material and the ring, and extends continuously about a rotational axis of the fan blades.

26. The apparatus of claim 25 wherein:

the blade bracket adapter is configured to support a radially inner portion of the light transmissive material; and the radially inner portion has a diameter that is smaller in size than an innermost diameter of an unobscured portion of the light transmissive material.

27. An apparatus comprising:

a housing that houses a fan motor;

fan blades extending radially away from the housing;

a light transmissive material disposed between the housing and the fan blades; and a ring to which the fan blades are fixed;

wherein, the light transmissive material:

is the only structure of the apparatus that extends radially between the ring and the housing; and provides at least partial visibility of a surface above the light transmissive material as viewed from below the light transmissive material; and the fan blades are configured to be fixed by fasteners to the ring.

* * * * *